Figure 1:
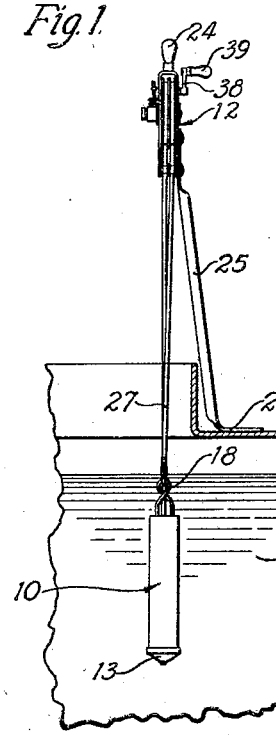

Aug. 9, 1932.  I. J. BALL ET AL  1,870,436
DEVICE FOR SAMPLING LIQUID
Filed Aug. 25, 1930  2 Sheets-Sheet 1

Inventors.
Ivan J. Ball
Stuart H. Ingram.
By
Their Attorney.

Aug. 9, 1932.  I. J. BALL ET AL  1,870,436
DEVICE FOR SAMPLING LIQUID
Filed Aug. 25, 1930   2 Sheets-Sheet 2

Inventor
Ivan J. Ball
Stuart H. Ingram
By
Their Attorney.

Patented Aug. 9, 1932

1,870,436

UNITED STATES PATENT OFFICE

IVAN J. BALL AND STUART H. INGRAM, OF LOS ANGELES, CALIFORNIA, ASSIGNORS OF ONE-THIRD TO SMITH-EMERY COMPANY, OF LOS ANGELES, CALIFORNIA, A CORPORATION OF CALIFORNIA

DEVICE FOR SAMPLING LIQUID

Application filed August 25, 1930. Serial No. 477,608.

This invention relates to a sampling device and relates more particularly to a device for sampling liquids. It is a general object of the invention to provide a device that is operable to obtain a portion or a sample from a body of liquid that is a true sample of the body of liquid as a whole.

It is often desirable to obtain a sample of a body of liquid to determine its quality or characteristics. Liquids, such as oil, are sampled to ascertain their water content and various other properties. Devices commonly known as "thieves" are employed to obtain samples of oil and like liquids. Standing bodies of liquid or bodies of liquid at rest stratify and are not homogeneous throughout their depths. Due to this stratification of the liquid it has been found difficult to provide a thief or sampling device that will obtain a sample from a body of liquid that is truly representative of the body of liquid as a whole.

It is an object of the invention to provide a thief or device for sampling liquids that is adapted to obtain a sample from a body of liquid that is a true and accurate sample of the entire body of liquid.

It is another object of the invention to provide a liquid sampling device that embodies a tube or cylinder adapted to be lowered into a body of liquid, and a plunger in the tube, which are controlled or caused to move relative to one another during their passage through the body of liquid so that a sample of the liquid is drawn into the tube, due to their relative movement, which is an accurate sample of the entire body of liquid.

Another object of the invention is to provide a liquid sampling device of the character mentioned in which the differential movement of the tube and plunger causes liquid to be drawn into the tube, and in which the ratio of differential movement of the tube and plunger is related to the shape of the body of liquid through which the tube is passed so that the quantity of liquid drawn into the tube during its vertical passage through any given unit or portion of the body of liquid is in direct relation to the horizontal dimensions of that portion of the body of liquid so that during the passage of the tube from the surface of the body to its bottom, an accurate sample of liquid is drawn into the tube which has the same constituents as the body of liquid in the same proportions as the body of liquid.

It is a further object of the invention to provide a liquid sampling device of the character mentioned that will take an accurate sample of any particular portion of a body of liquid. For example, it is adapted to take a sample of the lower portion of a body of liquid.

A further object of the invention is to provide a liquid sampling device that will take a sample from any particular horizon or level in a body of liquid.

It is another object of the invention to provide a liquid sampling device of the character mentioned in which the mechanism for controlling the relative movement between the tube and plunger is of simple and compact construction.

A further object of the invention is to provide a liquid sampling device of the character mentioned that is simple and inexpensive of manufacture and is easy and convenient to operate.

Figure 2:
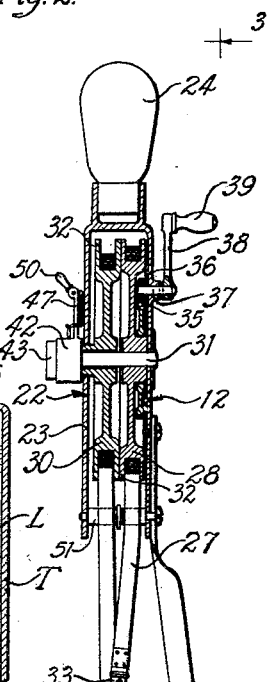
Figure 3:
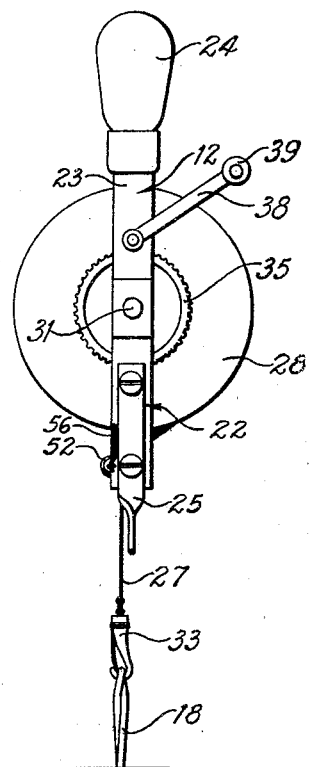
Figure 4:
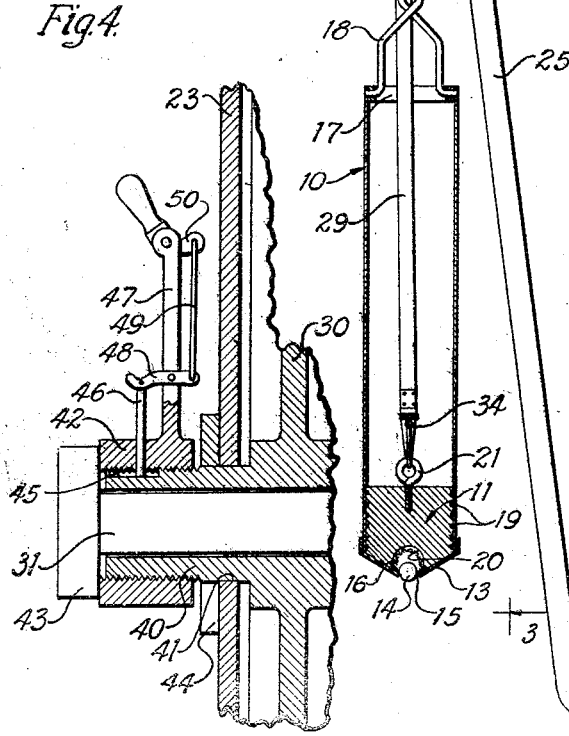
Figure 5:
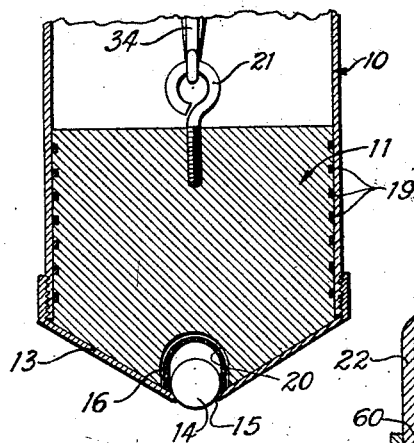
Figure 7:
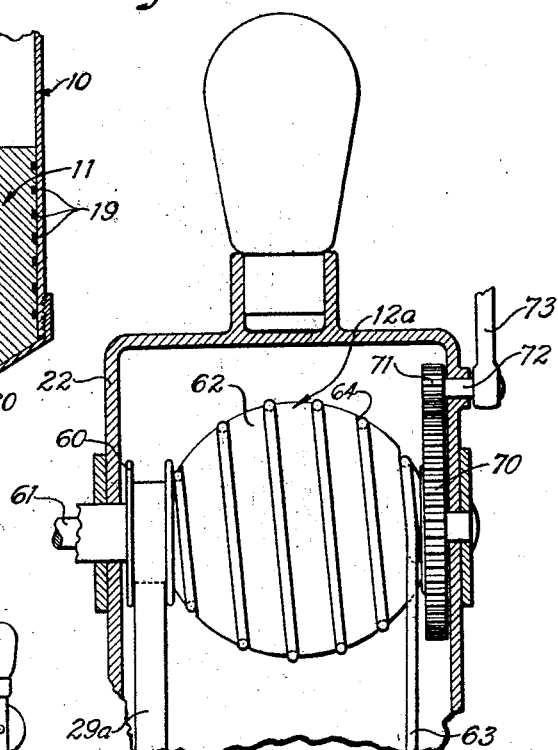
Figure 8:
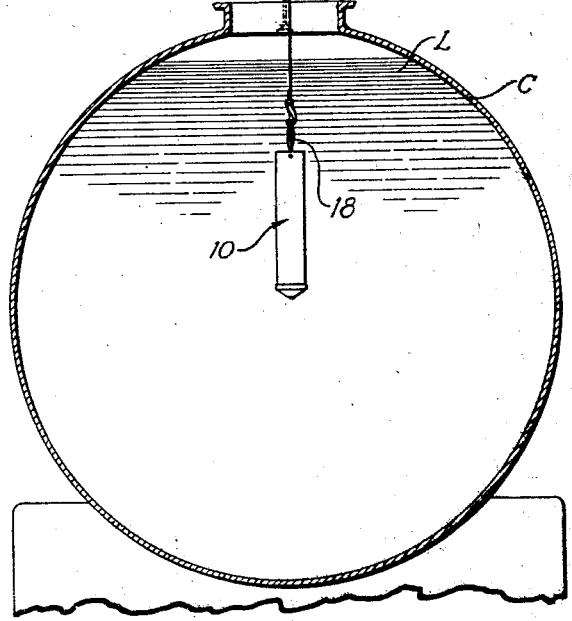
Figure 6:
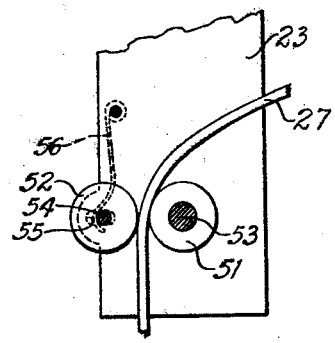

Other objects and features of our invention will be best and more fully understood from the following detailed description of typical forms and applications of the invention, throughout which description reference is had to the accompanying drawings, in which:

Fig. 1 is an end elevation of one form of device provided by this invention illustrating it in position at the top of a liquid container and showing the tube passing through the liquid in the container. Fig. 2 is an enlarged longitudinal detailed sectional view of the device. Fig. 3 is a side elevation of the device, being a view taken substantially as indicated by line 3—3 on Fig. 2. Fig. 4 is an enlarged vertical detailed sectional view of a portion of the means for controlling the movement of the tube and plunger. Fig. 5 is an enlarged vertical detailed sectional view of the lower end of the tube illustrating the plunger within the tube. Fig. 6 is an enlarged vertical detailed sectional view of the means for cleaning or removing the liquid from the flexible elements carrying the tube and plunger. Fig. 7 is a vertical detailed sectional view of the means for controlling the movement of the tube and plunger in a form of the invention intended for use in a body of liquid having varying horizontal dimensions, and Fig. 8 is a view illustrating the form of the invention illustrated in Fig. 7 in operating position on a horizontally disposed cylindrical tank or container.

The present invention is adapted to be embodied in a form for obtaining samples from liquid contained in a parallel-sided container and in a form or embodiment for taking samples of liquid contained in a tank or container having varying horizontal areas. In Figs. 1 to 6, inclusive, of the drawings we have illustrated a form of the invention particularly suited for obtaining samples from liquid in containers having parallel sides, while in Figs. 7 and 8 we have illustrated a form of the invention intended to obtain samples of liquid contained in tanks or containers having varying horizontal dimensions or capacities.

The embodiment of the present invention shown in Figs. 1 to 6, inclusive, of the drawings includes, generally, a cylinder or tube 10, a plunger 11 operable in the tube 10, and means 12 for controlling the relative movement of the tube 10 and plunger 11 to cause liquid to be drawn into the tube as it is lowered through a body L of liquid.

The tube 10 is preferably comparatively long and is intended to be lowered into the body L of liquid in a vertical position. The upper end of the tube 10 may be open, while the lower end of the tube is closed by a cap or head 13. The head 13 may be conical or may have downwardly and inwardly converging walls. A valve is provided in the head 13 to permit liquid to pass into the lower end of the tube and to prevent liquid from passing or discharging from the tube. The valve provided on the head 13 may be in the nature of a ball check valve and may include a ball 14 for controlling the passage of fluid through an opening 15 in the head 13, and a cage 16 for the ball. The cage 16 projects upwardly or inwardly from the inner side of the head 13 and may be formed of perforated material or screening. A ring 17 may be mounted in the upper end of the tube 10 for carrying a bail 18.

The plunger 11 is arranged within the tube 10 and is adapted to slide or operate longitudinally through the tube. The plunger 11 may be a solid or integral member and may be provided at its periphery with rings 19 for sealing with the inner walls of the tube 10. The lower end of the plunger 11 may be tapered or conical to seat on the inner side of the head 13 and a socket or recess 20 may be provided in the lower end of the plunger 11 to receive the valve cage 16. A suitable eye bolt 21 may be provided on the inner or upper end of the plunger 11 for connection with a flexible element or means for suspending the plunger.

The means 12 is provided to control the relative movement of the tube 10 and the plunger 11 as they are passed downwardly through the body L of liquid so that the tube 10 is caused or permitted to move downwardly more rapidly than the plunger 11 so that liquid is drawn into the lower end of the tube through the valve opening 15. The means 12 operates to control the relative or differential movement of the tube 10 and plunger 11 so that the speed of movement of the tube relative to the plunger is related to the speed of travel of the tube downwardly through the body L of liquid so that a uniform or equal volume of liquid enters the lower end of the tube 10 for each foot or unit of downward travel of the tube through the body of liquid.

In the particular form of the invention illustrated in the drawings the force of gravity is utilized for passing the tube 10 and the plunger 11 downwardly through the body L of liquid, and the means 12 operates to control the lowering or downward movement of the tube and plunger so that a given quantity of liquid is drawn into the lower end of the tube for each given unit of downward travel of the tube through the body L of liquid. The tube 10 is lowered into the body L of liquid with the plunger 11 at its lower end, and the means 12 operates to cause relative movement between the tube and plunger as they are both lowered downwardly so that the tube moves downwardly more rapidly than the plunger 11, and the plunger 11 is in the upper end portion of the tube upon the tube reaching the bottom of the body of liquid.

The means 12 includes a body or frame 22 having spaced vertical side plates 23. A suitable handle 24 may be provided at the upper end of the frame 22 to facilitate handling of the device. A leg 25 may be provided on the frame 22 for supporting the frame on the top of a container or tank T, or the like. The leg 25 may be attached to the outer side of one of the plates 23 and may project downwardly and outwardly from the plate. A horizontal part or foot 26 may be provided at the lower end of the leg 25 to engage or rest on the top of the tank T.

In accordance with the preferred form of the invention the means 12 includes a flexible element 27 for carrying or suspending the tube 10, a reel or pulley 28 for carrying the element 27, a flexible element 29 for suspending the plunger 11, and a reel or pulley 30 for carrying the element 29. The reels or pulleys 28 and 30 are mounted on a shaft 31 extending transversely between the spaced plates 23 of the frame 22. The flexible suspending elements 27 and 29 may be in the form of metallic tapes, and flanges 32 are provided at the peripheries of the reels 28 and 30 to guide the tapes 27 and 29. The element or tape 27 may be connected with the bail 18 at the upper end of the tube by a suitable swivel clip or connecting member 33. The tape 29 may be connected to the eye bolt 21 on the plunger by a swivel clip 34.

The pulley or wheel 28 for carrying the tube suspending element 27 is fixed on the shaft 31 adjacent the inner side of one of the plates 23. The invention provides means for controlling the speed of rotation of the reel 28 as the tube is lowered into the liquid L and for rotating the reels 28 and 30 to return the tube and plunger after they have passed downwardly through the liquid. In the particular case illustrated a gear 35 is mounted on the hub of the reel 28 and a pinion 36 meshes with the gear 35. The pinion 36 is carried on a shaft 37 projecting through an opening in a plate 23. An arm or crank 38 is provided on the shaft 37 and a suitable operating handle 39 may be provided on the end of the crank 38. It will be obvious how the speed of rotation of the reel 28 may be controlled by the handle 39 and the tube is lowered into the liquid and how the reel may be rotated to return the tube by operating the crank handle 39.

The reel 30 for carrying the plunger suspending tabe 29 is freely mounted on the shaft 31. The reel 30 is mounted on the shaft 31 adjacent the reel 28 and the invention provides means for releasably operatively connecting the reel 30 with the reel 28. A comparatively long hub 40 is provided on the reel 30. The hub 40 projects outwardly through an opening 41 in a frame plate 23. A nut 42 is screw threaded on the projecting portion of the hub 40 for reacting against an enlargement or head 43 on the outer end of the shaft 31 to shift the pulley 30 into frictional or driving engagement with the pulley 28. Upon threading of the nut 42 against the head 43, the inner flange 32 of the reel 30 is clamped against the inner flange of the reel 28 so that the pulley 30 is connected with the pulley 28 to rotate therewith. The nut 42 may be threaded along the hub 40 to engage or react against a collar 44 on the hub at the plate 23 to disengage the reel 30 from the reel 28. The nut 43 may be employed to clamp the reel 30 against the inner side of the plate 23 when it is desired to hold the plunger stationary and shift the tube 10.

The invention may embody means for releasably holding or setting the nut 42 against rotation or threading on the hub 40. A longitudinal groove or keyway 45 is provided in the outer end of the hub 40 and a pin 46 is slidable through an opening in the nut 42 to extend into the keyway 45 to connect the nut and hub for rotation. An arm 47 projects radially from the nut 42 and a lever 48 is pivoted to the arm 47. The lever 48 is connected to the pin 46. A link 49 is pivotally attached to an arm of the lever 48 and extends outwardly to a point adjacent the outer end of the arm 47. An operating lever 50 is pivoted at the outer end of the arm 47 to operate the link 49. It will be apparent how the lever 50 may be operated to raise the pin 46 out of the groove 45 so that the nut 42 may be threaded along the hub 40 and how the pin 46 may be operated into the keyway 45 to hold the nut 42 against threading on the hub 40.

In the preferred form of the invention means is provided for removing liquid from the tapes 27 and 28 when the tube 10 is withdrawn from the body L of liquid as will be hereinafter described. The tapes 27 and 29 pass over rollers 51 after leaving the reels 28 and 30. The rollers 51 may be rotatably mounted on pins 53 extending between the plates 23. Spring pressed rollers 52 are provided to engage against the tapes 27 and 29 and to hold the tapes in engagement with the rollers 51. The rollers 52 are rotatably mounted on pins 54 spaced horizontally from the pins 53. The pins 54 extend into horizontally elongated slots 55 in the side plates 23. Springs 56 engage the pins 54 to yieldingly urge the rollers 52 against the tapes. The tapes 27 and 29 pass between the rollers 51 and 52 which operate to squeeze or remove liquid from the tapes as they are pulled upwardly out of the liquid.

The reels 28 and 30 are of different effective diameters so that the tube 10 moves downwardly more rapidly than the plunger 11 when the reels 28 and 30 are operatively connected and the tube and plunger are lowered through the liquid L. The reel 28 has a larger effective diameter than the reel 30 so that the tube 10 is permitted to move downwardly more rapidly than the plunger 11 as they are lowered into the liquid L. The plunger 11 is preferably disposed at the lower end of the tube 10 when the plunger 11 passes into the liquid L. The reel 30 may be disconnected from the reel 28 by threading the nut 42 against the collar 44 so that the tube 10 may be lowered to the surface of the liquid L without causing movement of the tube relative to the plunger 11. When the head 13 is at the surface of the liquid the nut 42 may be threaded against the head 43 to force the reel 30 against the reel 28. When the tube 10 and piston 11 are permitted to pass downwardly through the liquid L with the reels 28 and 30 operatively connected in the manner described above, the tape 27 is allowed to pass from the reel 28 more rapidly than the tape 29 is passed from the reel 30, so that the tube 10 is permitted to pass downwardly more rapidly than the plunger 11. The respective diameters of the reels 28 and 30 may be related to the depth of the body of liquid L so that the plunger 11 will be disposed adjacent the upper end of the tube 10 upon the tube reaching the bottom of the body of liquid. The relative movement between the tube 10 and plunger 11 during their downward movement through the body L of liquid causes liquid to be drawn through the opening 15 into the tube 10. In practice the tape 27 may be slightly thicker than the tape 29 to compensate for the difference in the amount of tape passing from the reels 28 and 30 so that the ratio of differential movement of the tube and the plunger remains constant during their downward movement through the body of liquid. As the speed of movement of the tube 10 relative to the plunger 11 remains constant during the entire passage of the tube 10 downwardly through the body L of liquid, equal quantities of liquid drawn into the cylinder for each given unit of downward travel of the cylinder.

When it is desired to withdraw to tube 10 and plunger 11 from the body L of liquid, the crank 38 may be operated to wind the tapes 27 and 29 on the reels 28 and 30. The sample of liquid may be withdrawn or removed from the tube 10 by pushing the ball 14 upwardly out of is closing position so that the liquid is free to discharge through the opening 15. When the tube 10 is withdrawn from the liquid L the rollers 51 and 52 remove the liquid from the tapes 27 and 29.

When it is desired to obtain a sample of any given vertical porition of the body of liquid, the tube 10 is lowered through the liquid to the upper end of the portion where the same is to be taken. During lowering of the tube to this position the reel 30 is disconnected from the reel 36 but is free to rotate so that the plunger 11 remains in the lower end of the tube 10. The nut 42 may then be threaded along the hub 40 to clamp the reel 30 against the plate to hold it against movement. The tube may then be lowered the desired distance to cause liquid to be drawn into the tube. During lowering of the tube the plunger remains stationary.

When a sample is to be taken at any given depth or level, the tube 10 is lowered through the liquid to a point where the head 13 is at the depth where the sample is to be taken. During lowering of the tube to this position the reel 30 is free so that the plunger remains in the lower end of the tube. The tube is then held stationary by holding the crank 36 and the element 29 is drawn upward to raise the plunger through the tube and cause liquid to be drawn into the lower end of the tube.

The form of the invention illustrated in Figs. 7 and 8 of the drawings is intended to be employed to take samples from liquid contained in tanks or containers having varying horizontal areas or capacities. In this form of the invention the ratio of speed of the relative movement between the tube 10 and plunger 11 varies relative to the shape of the container in which the liquid is held so that a greater volume of liquid is drawn into the tube during its passage through the portion of the body of liquid having the greatest horizontal dimension. In Fig. 7 of the drawings I have shown this form of the invention employed in sampling liquid contained in a horizontally disposed cylindrical container C.

In the form of the invention intended for use in sampling liquid contained in a container of the type illustrated in Fig. 8, the speed of the relative movement between the tube 10 and plunger 11 is greatest during the passage of the tube through the portion of liquid at the center of the container.

In the form of the invention illustrated in Figs. 7 and 8 of the drawings the tube 10 and plunger 11, as well as the body or frame 22, may be of the same construction as in the form of the invention described above. The means 12$^a$ for controlling the speed of relative movement between the tube and plunger is such that the speed of the tube relative to the plunger is gradually increased during its passage through the upper portion of the body of liquid contained in the container C until it reaches the center of the container and gradually decreases during its passage downwardly through the lower portion of the body of liquid.

The means 12$^a$ includes a pulley or reel 60 for carrying the flexible element or tape 29$^a$ suspending the plunger 11. The reel 60 is freely mounted on a shaft 61 and may be controlled in the same manner as the reel 30 described above. A reel or pulley 62 is mounted on the shaft 61 for carrying a flexible element or line 63 suspending the tube 10. The pulley 62 is formed so that the speed of the differential movement between the tube and plunger varies during the passage of the tube through the body of liquid. In the case where the liquid is contained in a horizontally disposed cylindrical container C the pulley 62 is substantially spherical. The element 63 may be in the form of a line or wire and is helically wound around the spherical pulley 62. A helical groove 64 may be provided in the pulley 62 for guiding the element 63. The pulley 62 is of greater effective diameter at the points where the element 63 passes over its end portions than the reel 60 so that the tube 10 moves more rapidly than the plunger 11 during the first and last parts of the passage of the cylinder through the body of liquid.

The reel 60 is mounted on the shaft 61 so that it is adapted to be forced into operative engagement with the end of the spherical pulley 62. The reel 60 may be releasably held in rotative engagement with the pulley 62 in the same manner as the pulley 30 is held in engagement with the reel 28 in the form of the invention described above. Suitable means is provided for controlling rotation of the shaft 61 and for rotating the shaft to wind the elements 29ª and 63 onto the reels 60 and 62. In the particular case shown a gear 70 is provided on the shaft 61 and a pinion 71 meshes with the gear. The pinion 71 is carried on a shaft 72 having an operating crank 73.

It will be obvious that upon unwinding of the elements 63 and 29ª that more of the line 63 passes from the central portions of the pulley 62 than passes from its end portions. As the speed of the downward movement of the plunger 11 remains constant during its entire passage through the liquid and the speed of the tube 10 gradually increased from the time that it enters the liquid until it reaches the center of the body of liquid and then gradually decreased until it reaches the bottom of the body of liquid, there is a greater volume of liquid drawn into the tube 10 during its passage through the center of the body of liquid than during its passage through the upper and lower portions of the liquid. It will be obvious that the reel 60 and the spherical pulley 62 may be related and proportioned to provide for the desired ratio of differential movement of the tube and plunger.

It is to be noted that the invention provides a device that is adapted to obtain a sample of liquid that is truly representative of an entire body of liquid. In the form of the invention illustrated in Figs. 1 to 6, inclusive, of the drawings the downward speeds of movement of the tube 10 and plunger 11 remain constant during their entire passage downwardly through the body of liquid so that equal quantities of liquid are drawn into the tube 10 from all portions of the body of liquid through which the tube passes. In the form of the invention illustrated in Figs. 7 and 8 of the drawings the speed of relative movement of the tube 10 and plunger 11 is controlled by the means 12ª so that greater quantities of liquid are drawn into the plunger 11 during its passage through the central portion of the body which has the greatest mass, so that a true and accurate sample is taken. It is to be noted that the principle of operation of the two forms of the invention is substantially alike; that is, the relative movement between the tube 10 and plunger 11 is controlled so that the quantity of liquid drawn into the tube is directly related to the horizontal dimension of the portion of the body of fluid through which the tube passes, so that an accurate sample is taken of the liquid. Both forms of the invention are adapted to take samples of any given portion of a body of liquid, or to take samples from the liquid at any depths or levels.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. A liquid sampling device including, a tube, a plunger operable in the tube, and means for controlling the relative movement between the tube and plunger as they are passed through a body of liquid to cause liquid to be drawn into the tube, said means including flexible members connected with the tube and plunger, and means to be arranged above the surface of the liquid for controlling the movement of the members.

2. A liquid sampling device including, a tube adapted to be passed through a body of liquid, a plunger in the tube, and means for causing relative movement between the tube and plunger as the tube is passed through liquid to cause liquid to be drawn into the tube, said means including members connected with the tube and plunger to extend to the surface of the liquid, and means to be disposed above the surface of the liquid for operating the members, the said members forming the sole connection between the elements and the last mentioned means.

3. A liquid sampling device including, two elements adapted to be passed through a body of liquid, one of the elements being a tube, the other being a plunger in the tube, and means for controlling the passage of the elements through the liquid so that one element moves more rapidly than the other to cause ating each element in the liquid, and means including a member for suspending and operating each element in the liquid, and means to be disposed exterior to the liquid for operating the members, the said members forming the sole connections between the elements and the last mentioned means.

4. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, the ratio of speed of movement between the elements being related to the horizontal configuration of the body of liquid so that the quantity of liquid drawn into the tube during the vertical passage of the elements through a given portion of the body of liquid is in proportion to the horizontal dimension of the said portion, said means including a member for suspending and operating each element in the liquid, and means to be disposed exterior to the liquid for operating the members.

5. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, the ratio of speed of movement between the elements being related to the horizontal configuration of the body of liquid so that the quantity of liquid drawn into the tube during the vertical passage of the elements through a given portion of the body of liquid is in proportion to the horizontal dimension of the said portion, said means including reels of different effective diameters, and flexible members attached to the elements and wound on the reels.

6. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including a reel, a flexible member attached to the tube and wound on the reel, a second reel, and a flexible member attached to the plunger and wound on the said second reel, the first mentioned reel being of greater effective diameter than the said second reel.

7. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including two reels of different effective diameters, a flexible member suspending the tube and wound on one of the reels, and a flexible members suspending the plunger and wound on the other reel.

8. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including two reels of different effective diameters, flexible members wound on the reels and suspending the elements, and means for releasably rotatively connecting the reels.

9. A liquid sampling device including, two elements adapted to be pasesd through a body of liquid, one of the elements being a tube, the other being a plunger in the tube, and means for controlling the passage of the elements through the liquid so that one element moves more rapidly than the other to cause liquid to be drawn into the tube, said means including a shaft, a reel on the shaft to rotate therewith, a flexible element suspending one of the elements and wound on the reel, a reel freely mounted on the shaft, a flexible element carrying the other element and wound on the last mentioned reel, the reels being of different effective diameters, and means for releasably rotatively connecting the freely mounted reel with the shaft.

10. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including a shaft, a reel on the shaft to rotate therewith, a flexible element suspending one of the elements and wound on the reel, a reel freely mounted on the shaft, a flexible element carrying the other element and wound on the last mentioned reel, the reels being of different effective diameters, means for controlling rotation of the shaft, and means for releasably rotatively connecting the freely mounted reel with the shaft.

11. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including a shaft, a reel mounted on the shaft to rotate therewith, a flexible member carrying one of the elements and wound on the reel, a reel freely mounted on the shaft, the two reels being of different effective diameters, a flexible element carrying the other element and wound on the freely mounted reel, and means for releasably rotatively connecting the said reels.

12. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, said means including a shaft, a reel mounted on the shaft to rotate therewith, a flexible member carrying one of the elements and wound on the reel, a reel freely mounted on the shaft, the two reels being of different effective diameters, a flexible element carrying the other element and wound on the freely mounted reel, and means for releasably rotatively connecting the said reels including, a screw threaded member on the freely mounted reel adapted to engage a projection on the shaft.

13. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, including a member for suspending and operating the tube in the liquid, means at the surface of the liquid for operating said member for controlling the movement of the tube, a member for suspending and operating the plunger in the liquid, and means at the surface of the liquid for operating the last-named member for controlling the movement of the plunger, the two last mentioned means being releasably operatively connected.

14. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, including a member for suspending and operating the plunger in the liquid, means at the surface of the liquid for operating said member for controlling the movement of the tube, a member for suspending and operating the plunger in the liquid, means at the surface of the liquid for operating the last-named member for controlling the movement of the plunger, and means for releasably operatively connecting the two last mentioned means.

15. A liquid sampling device including, two elements adapted to be passed through a body of liquid, one of the elements being a tube, the other being a plunger in the tube, and means for controlling the passage of the elements through the liquid so that one element moves more rapidly than the other to cause liquid to be drawn into the tube, the ratio of speed of movement between the elements being related to the horizontal configuration of the body of liquid so that the quantity of liquid drawn into the tube during the vertical passage of the elements through a given portion of the body of liquid is in proportion to the horizontal dimension of the said portion, said means including a cylindrical reel, a reel having a longitudinal cross-sectional configuration corresponding generally to the vertical cross sectional configuration of the body of liquid, and flexible elements connected to the elements and wound on the reels.

16. A liquid sampling device including two elements adapted to be passed through a body of liquid, one of the elements being a tube, the other being a plunger in the tube, members for individually suspending and operating the elements in the liquid, means for controlling the operation of the members so that one element moves more rapidly than the other during passage of the elements through the liquid to cause liquid to be drawn into the tube, and manual means for holding one of the members against movement whereby the tube may remain stationary relative to the plunger to cause a sample to be drawn into the tube a certain depth in the liquid.

17. A liquid sampling device including two elements adapted to be passed through a body of liquid, one of the elements being a tube, the other being a plunger in the tube, members for individually suspending and operating the elements in the liquid, means for controlling the operation of the members so that one element moves more rapidly than the other during passage of the elements through the liquid to cause liquid to be drawn into the tube, and optional means for holding one of the members against operation during operation of the other member whereby the plunger may remain stationary relative to the tube to cause a sample to be drawn into the tube from a vertical portion of the body of liquid.

In witness that we claim the foregoing we have hereunto subscribed our names this 9th day of July, 1930.

IVAN J. BALL.
STUART H. INGRAM.

CERTIFICATE OF CORRECTION.

Patent No. 1,870,436. August 9, 1932.

IVAN J. BALL ET AL.

It is hereby certified that error appears in the printed specification of the above numbered patent requiring correction as follows: Page 5, line 104, claim 3, strike out the syllable and words "ating each element in the liquid, and" and insert instead liquid to be drawn into the tube, said; and that the said Letters Patent should be read with this correction therein that the same may conform to the record of the case in the Patent Office.

Signed and sealed this 22nd day of November A. D. 1932.

(Seal)

M. J. Moore,
Acting Commissioner of Patents.